Patented Aug. 9, 1938

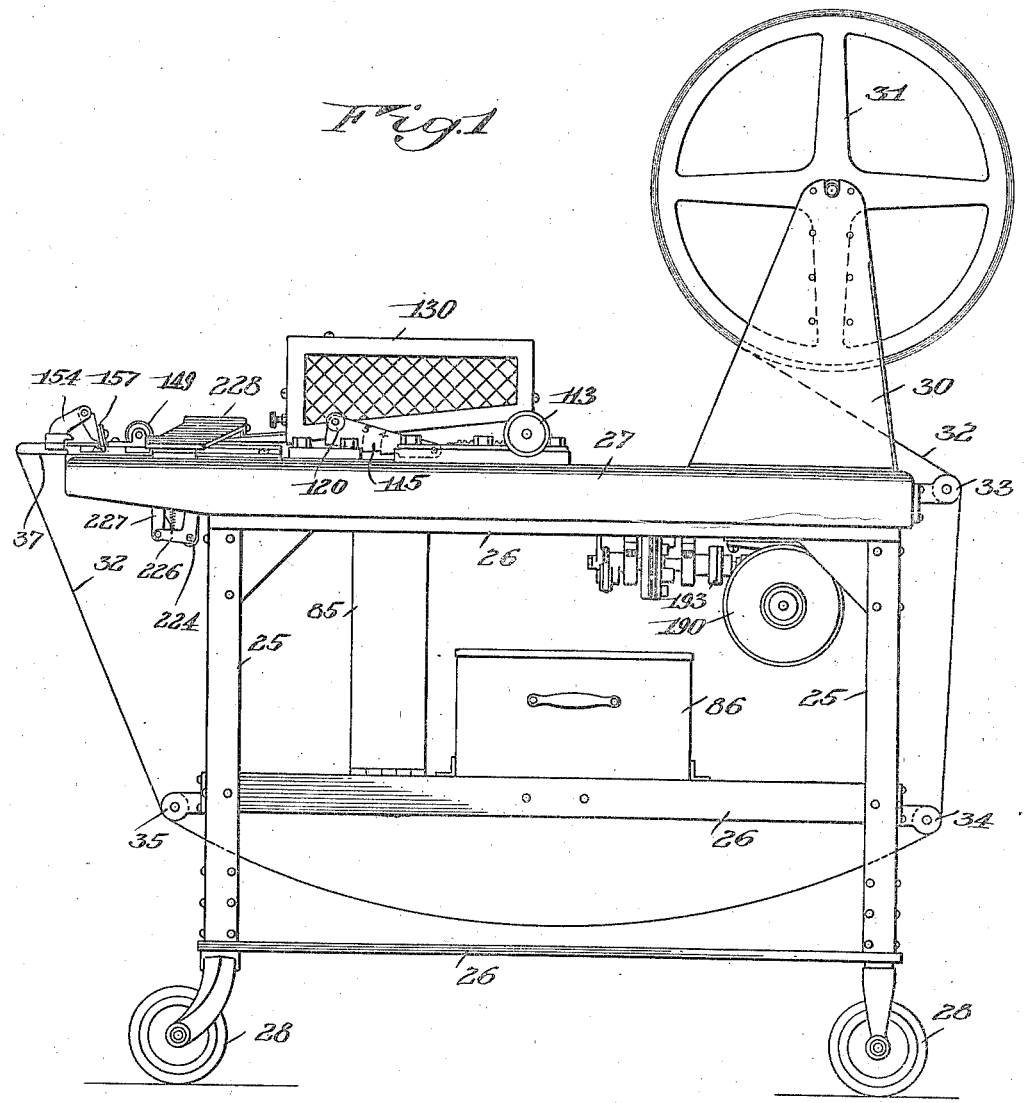

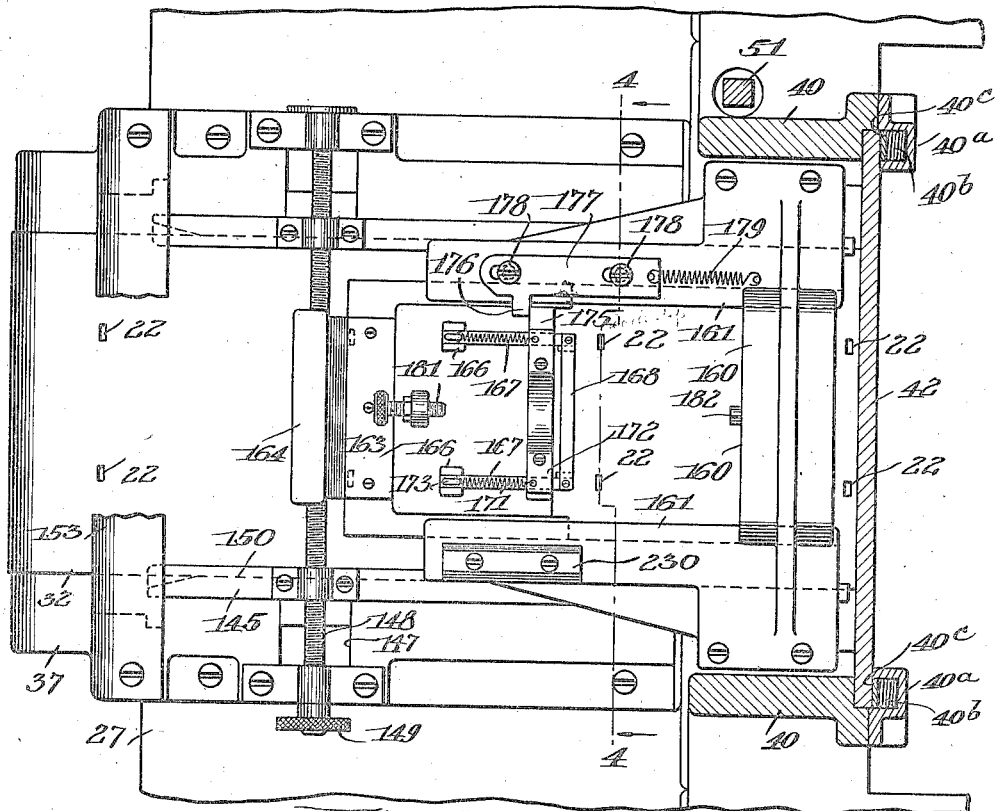
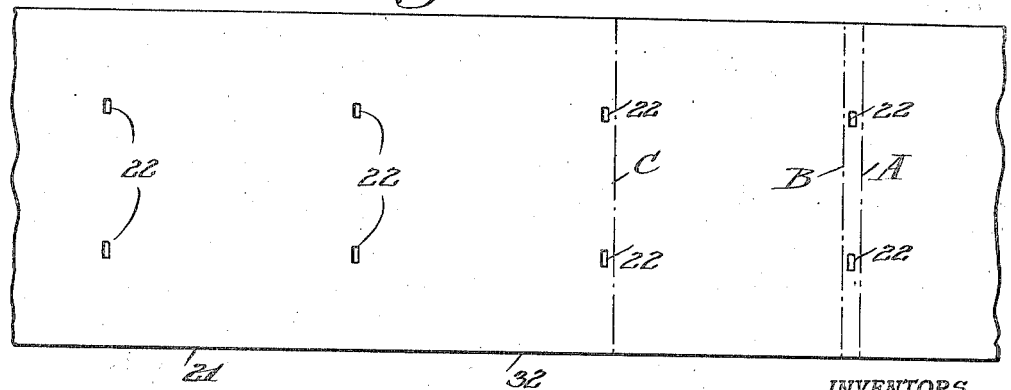

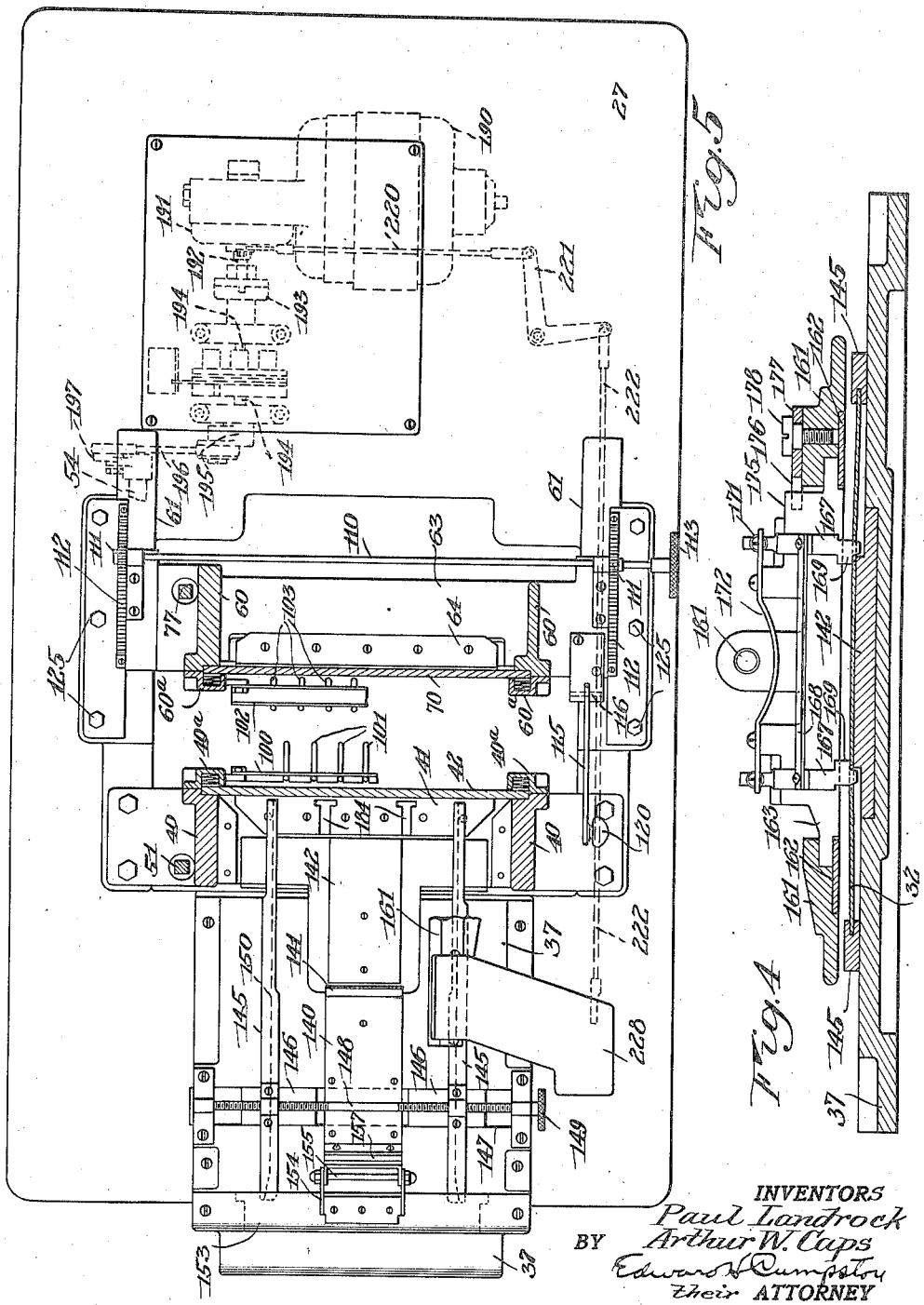

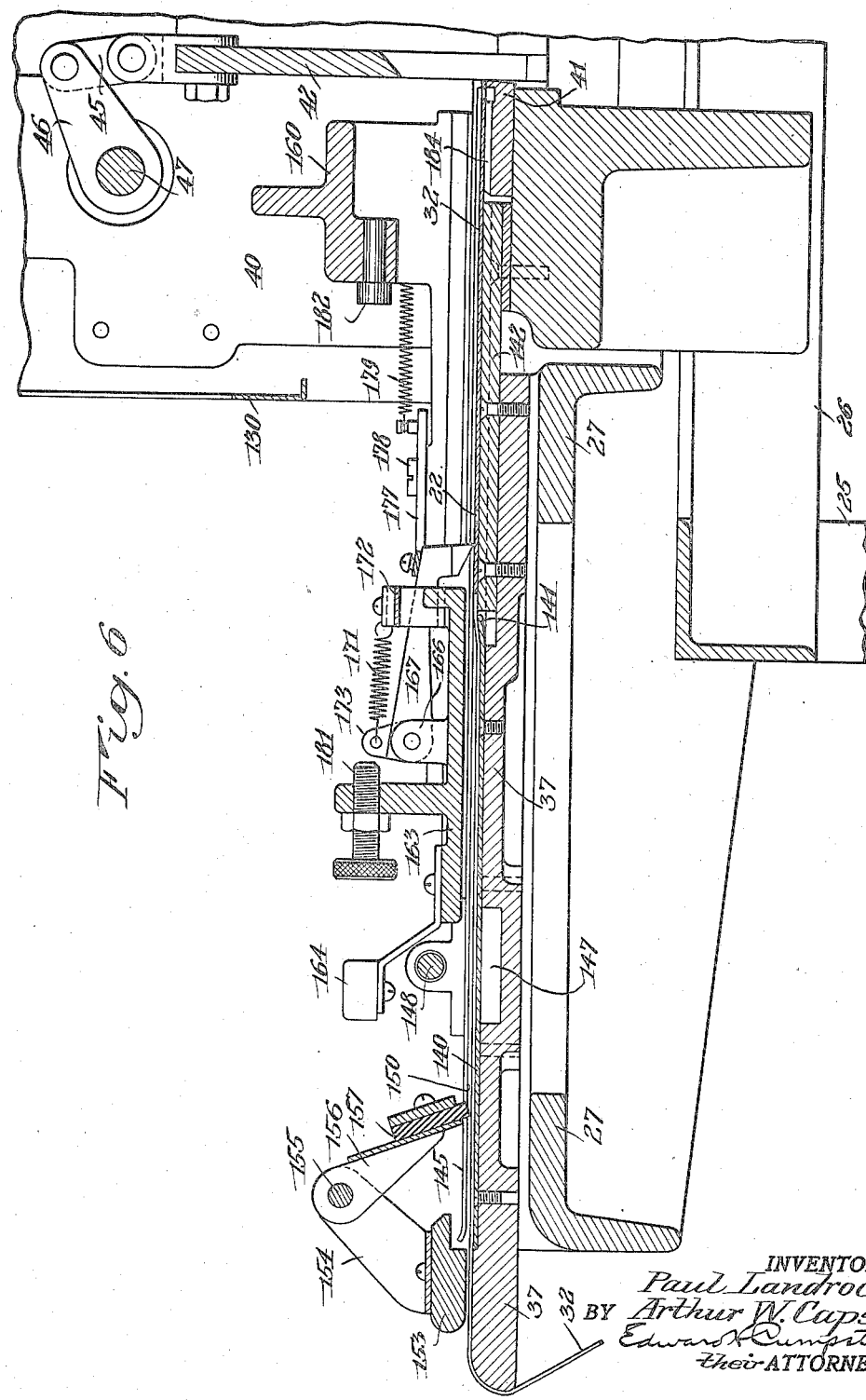

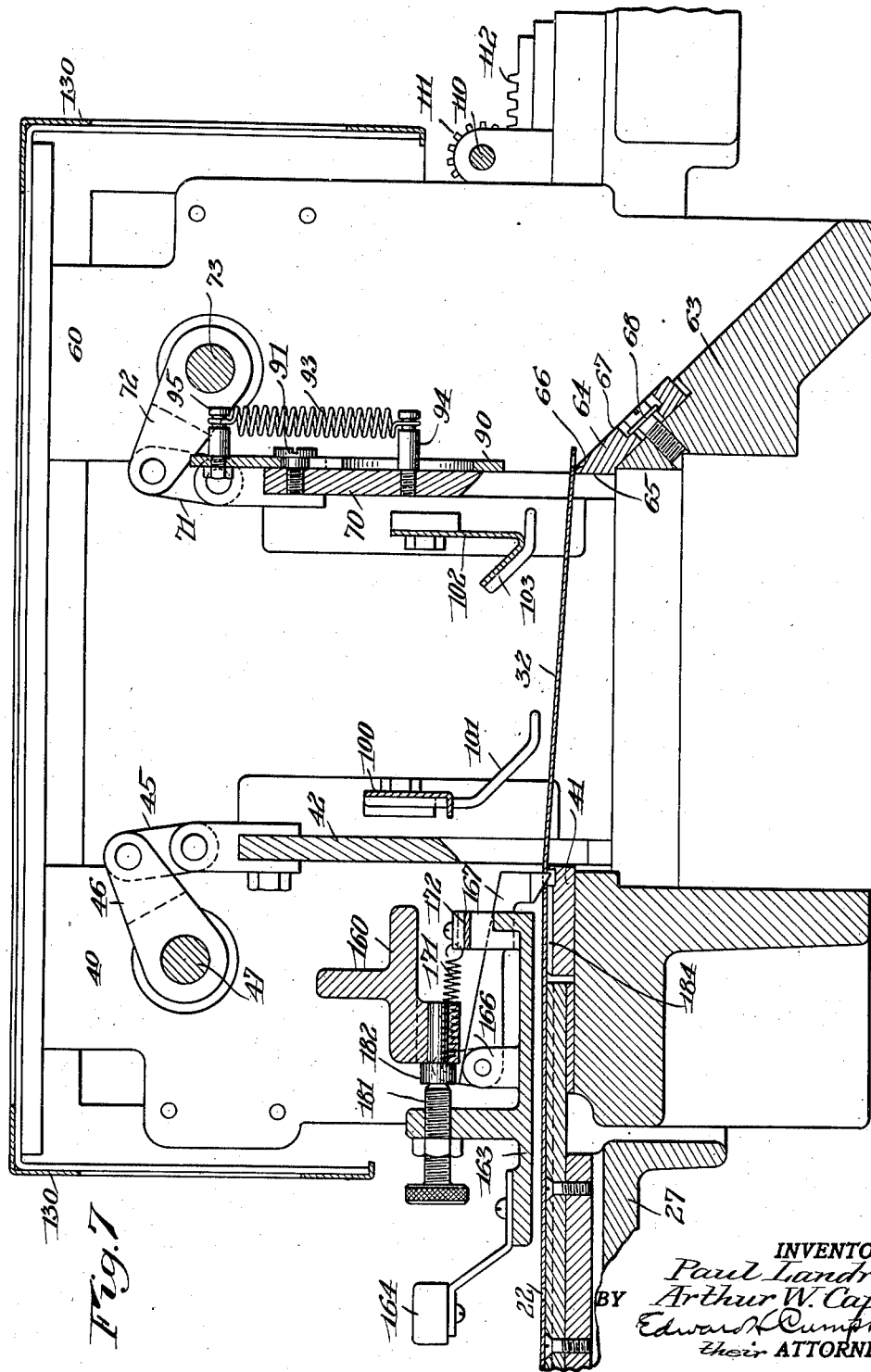

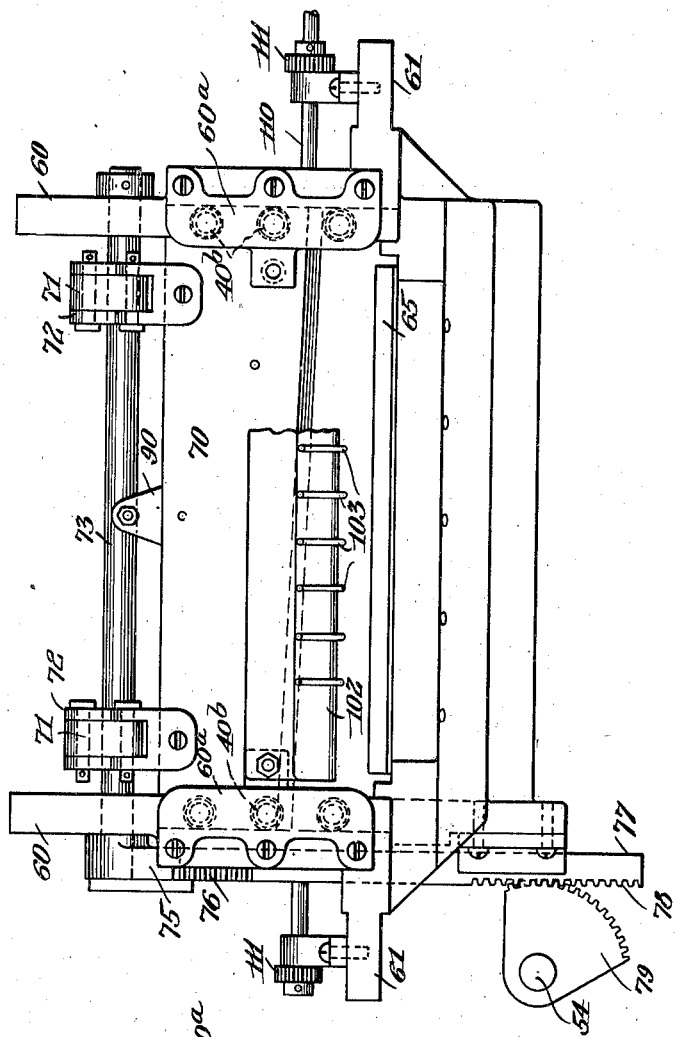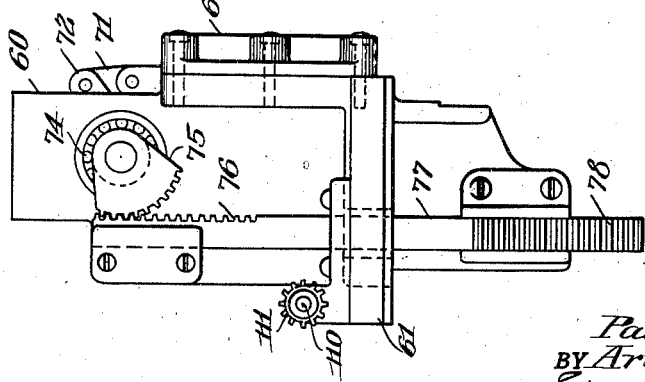

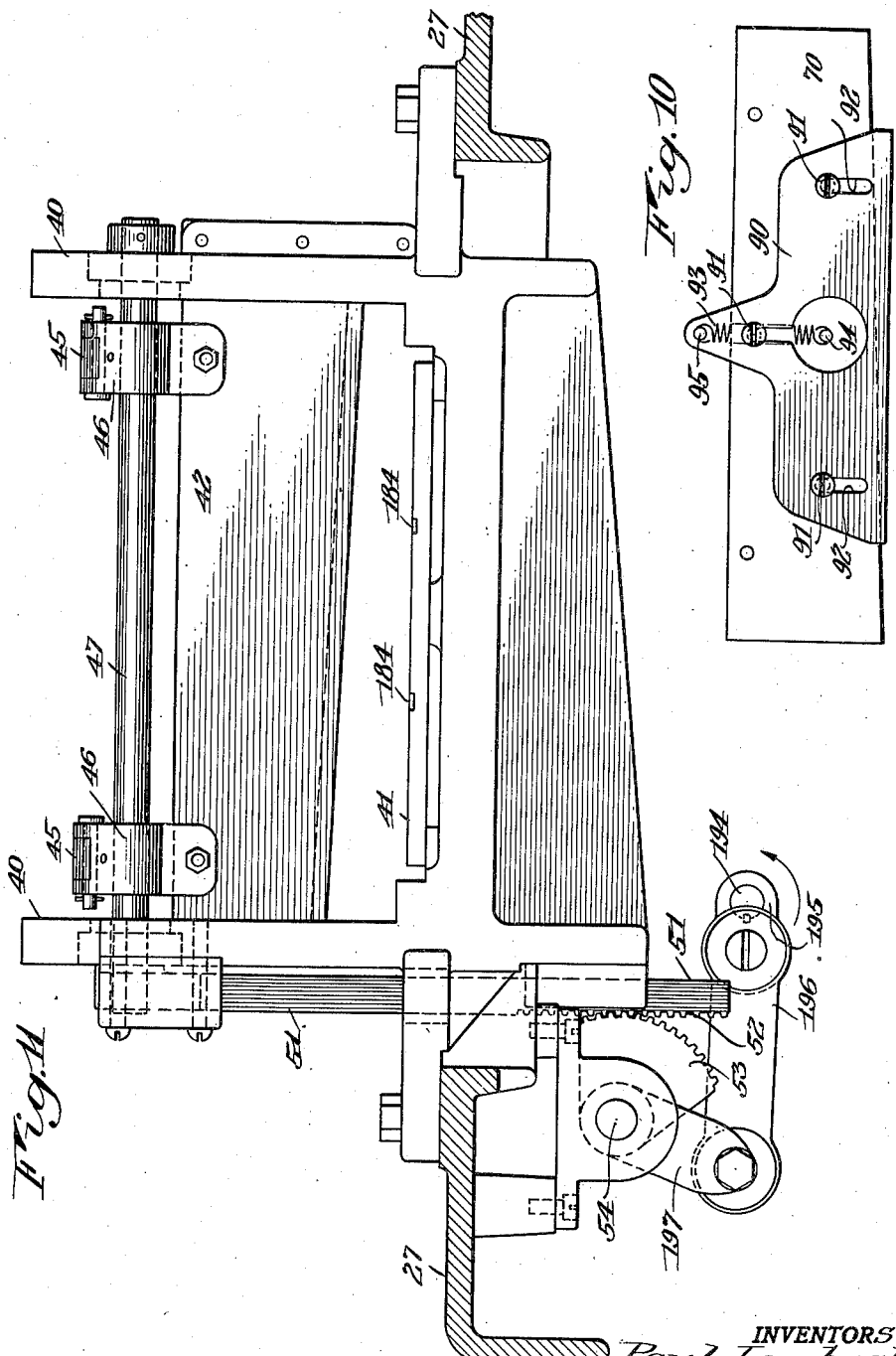

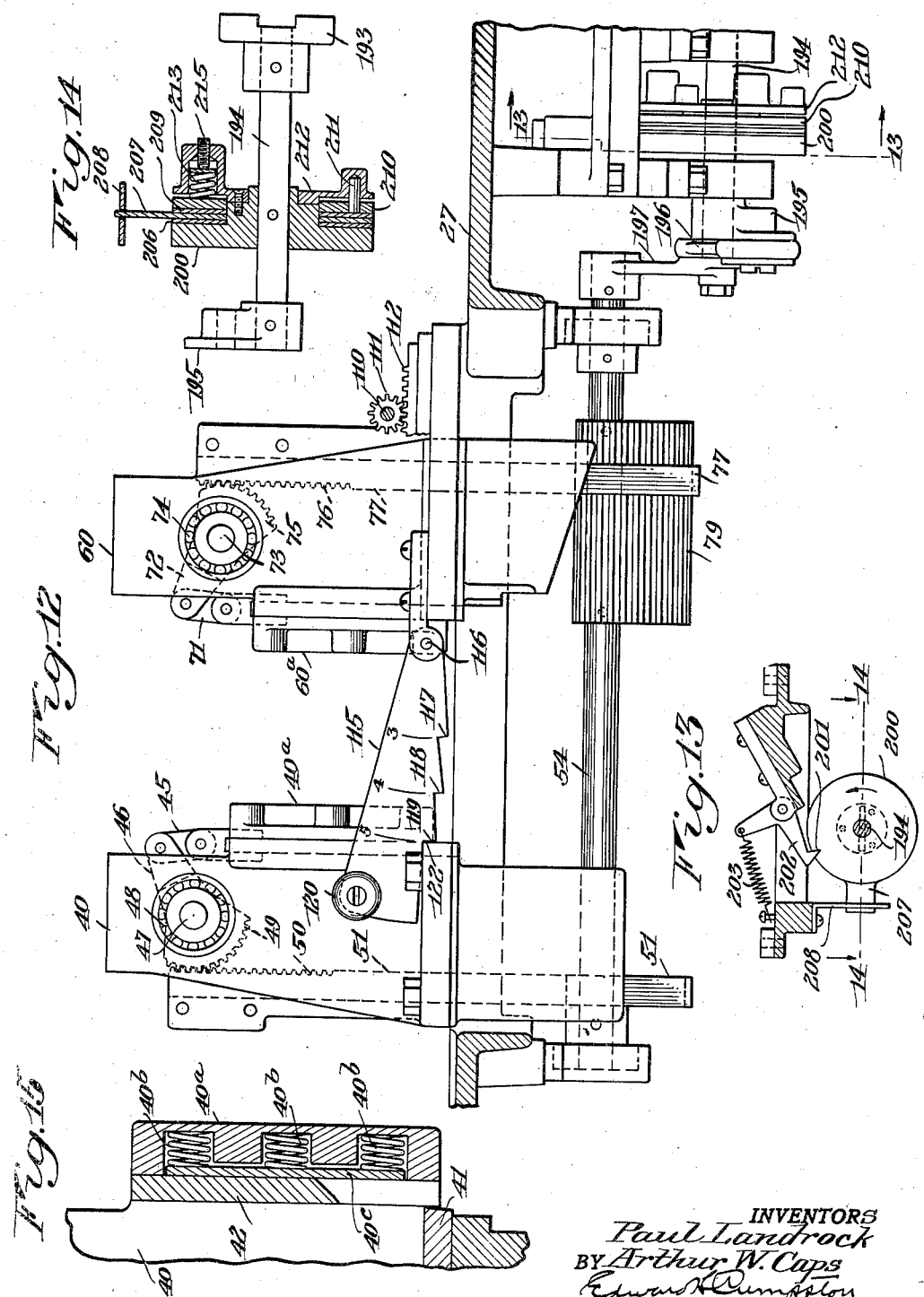

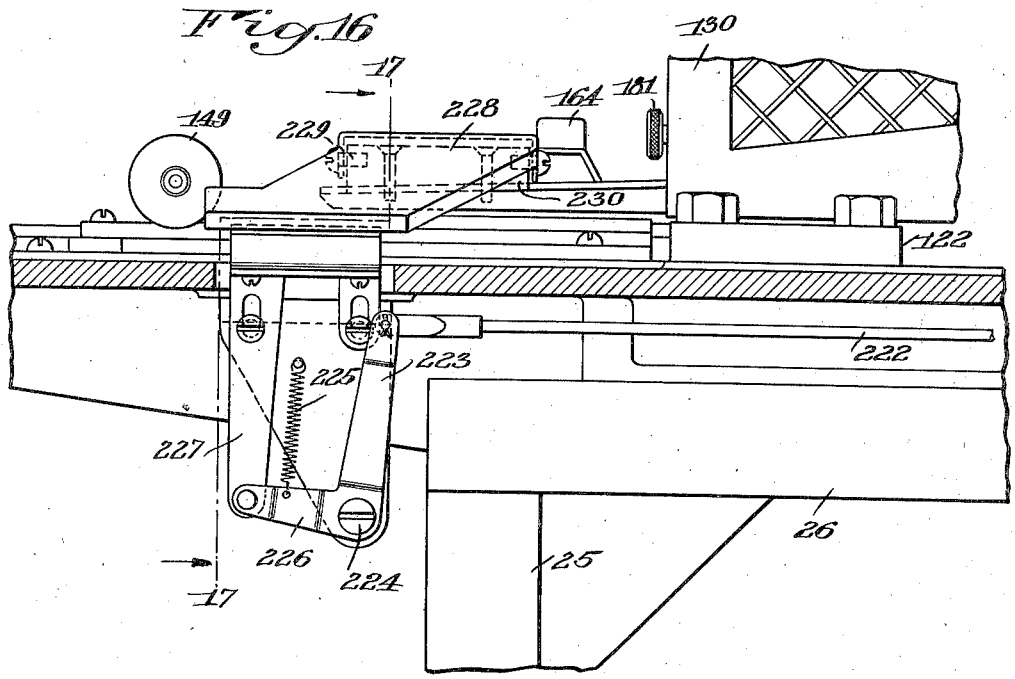
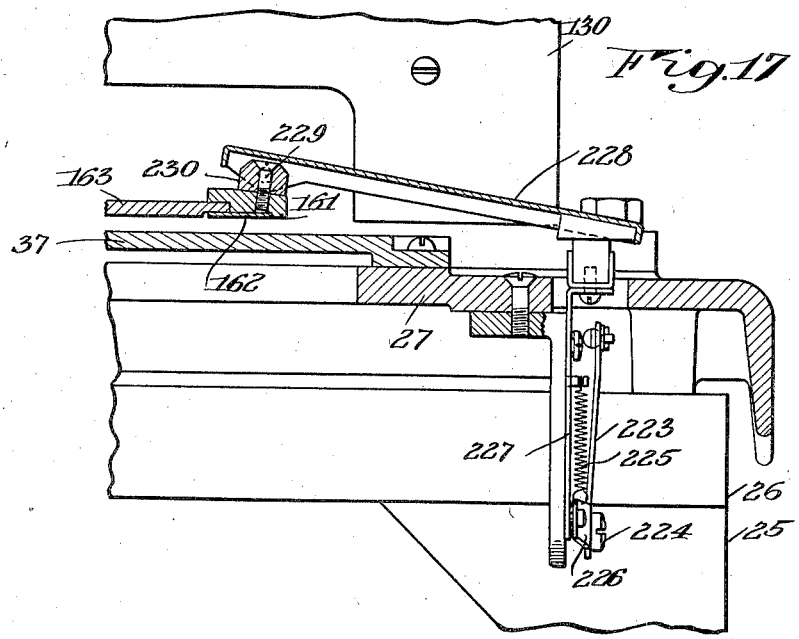

2,126,478

UNITED STATES PATENT OFFICE 2,126,478

SHEET CUTTING APPARATUS

Paul Landrock and Arthur W. Caps, Rochester,
N. Y., assignors to Photostat Corporation,
Providence, R. I., a corporation of Rhode Island Application January 4, 1936, Serial No. 57,591

19 Claims. (Cl. 164—48)

This invention relates to apparatus for cutting sheets, and particularly for cutting paper and card stock.

An object of the invention is the provision of a generally improved and more satisfactory cutting machine.

Another object is the provision of simple apparatus for concomitantly making two cuts in a strip of stock, at a distance from each other which remains exactly uniform during successive cutting operations, so that a large number of pieces of exactly uniform length may be cut by the apparatus, for use as filing cards or for other purposes.

Another object is the provision of apparatus for cutting a waste portion and a useful portion concomitantly from a strip of stock.

Still another object is the provision of cutting apparatus for making spaced cuts at distances from each other which remain uniform so long as desired, but which may be easily varied or adjusted when desired.

A further object is the provision of cutting apparatus which is easy in operation and which causes little or no fatigue on the part of the operator.

A still further object is the provision of apparatus having the above mentioned characteristics, which is also portable and compact.

To these and other ends the invention resides in certain improvements and combinations of parts, all as will be hereinafter more fully described, the novel features being pointed out in the claims at the end of the specification.

In the drawings:

Fig. 1 is a side elevation of apparatus constructed in acordance with a preferred embodiment of the invention;

Fig. 2 is a view of a strip of stock to be cut, illustrating the position of the cuts made by the preferred form of the apparatus;

Fig. 3 is a plan of the left hand end of the apparatus, with parts in horizontal section;

Fig. 4 is a vertical section taken transversely through the apparatus substantially on the line 4—4 of Fig. 3;

Fig. 5 is a plan of the entire apparatus with parts in horizontal section and with parts omitted;

Fig. 6 is a vertical longitudinal section taken substantially centrally through the left hand end of the apparatus;

Fig. 7 is a similar vertical longitudinal section taken substantially centrally through the knife assemblies;

Fig. 8 is an elevation of one of the knife assemblies;

Fig. 9 is an end view thereof;

Fig. 10 is an elevation of one of the cutting knives detached from the rest of the mechanism, showing a stock holding element mounted thereon;

Fig. 11 is an elevation of one of the knife assemblies with parts of the frame in vertical section;

Fig. 12 is a side view of the knife assemblies and associated mechanism with parts of the frame in vertical section;

Fig. 13 is a detail of part of the driving mechanism, with parts in section, taken substantially on the line 13—13 of Fig. 12;

Fig. 14 is a horizontal section through part of the driving mechanism, taken substantially on the line 14—14 of Fig. 13;

Fig. 15 is a vertical section showing details of the spring gibs for the cutting knives;

Fig. 16 is a side view, with parts of the frame in vertical section, of the trip mechanism for setting the driving mechanism in operation, and Fig. 17 is a vertical section taken substantially on the line 17—17 of Fig. 16.

The same reference numerals throughout the several views indicate the same parts.

In one known form of photographic apparatus, cards or similar records to be copied are photographed on a long strip of sensitized material, such as paper or, preferably, card stock. Usually, the successive cards or other records being photographed, are not reproduced on the strip of stock in abutting relationship to each other, but are slightly spaced from each other by a distance, sometimes more or less variable, constituting a waste portion of the strip. In this waste portion between each two successive card areas or useful areas, one or more perforations (usually two) are placed at the time of the photographing operation, at a definite uniform distance from one edge of the card area or useful area. In the preferred embodiment of the sheet cutting apparatus of the present invention, these perforations are used in feeding the strip and placing the useful areas thereof accurately with relation to the cutting knives.

After the photographed images on the strip of paper or card stock have been developed and fixed according to known photographic processes, the strip is then cut up to separate the successive card areas or useful areas from each other and from the interspersed waste areas or zones. When this cutting is completed, there will have been provided a series of sheets or cards bearing photographic reproductions of the original sheets or cards which were photographed, but not necessarily of the same size (inasmuch as the size of the originals may be either reduced or enlarged in the photographing operation) which reproductions may be used for duplicate records or in any other desired way.

While the present invention will be described by way of example in connection with a preferred embodiment adapted for cutting strips of material of the kind above described, it is to be understood that the invention is not limited to the cutting of such strips of material, and many features of the invention are capable of use in cutting other kinds of material besides the strips above mentioned, and in cutting strips without the perforations above mentioned, or in which the perforations are arranged differently than above described.

Referring now to the drawings, and particularly to Fig. 2 thereof, there is shown at 21 a strip of material, such as paper or card stock, which is particularly adapted to be cut by the preferred form of apparatus made in accordance with this invention. This strip 21 is of a width corresponding to one dimension (for example, but not necessarily, the length) of the sheets or cards to be cut from the strip. Successive useful areas are separated from each other by waste areas each containing two perforations 22. If this strip be cut transversely along lines A and B on opposite sides of each pair of perforations, and at the proper distance from each other, it is seen that the strip may be separated into narrow waste areas containing the perforations, and wider areas between these successive waste areas, containing the useful matters or records. The preferred apparatus of the present invention is adapted to make such cuts quickly, efficiently, and accurately.

While it is possible to make the two cuts A and B at the same time, yet it is ordinarily preferred to cut the two edges of the same card or useful area at the same time, rather than to cut the two edges of the waste strip at the same time, because it is desired to produce a series of cards or useful areas of exactly uniform dimensions, whereas the exact dimensions of the waste strips are of no moment. In other words, the apparatus according to the preferred embodiment makes the cuts indicated in Fig. 2 at B and C at the same time, the cut A having been made during the last previous cutting operation.

Turning now to Fig. 1 of the drawings, there is illustrated a preferred embodiment of the machine, comprising a small portable carriage or frame having upright members 25, various horizontal members 26 and a top 27 of substantial construction, the whole being mounted on suitable wheels or casters 28 so as to be readily portable.

Near one end of the machine which may for convenience be described as the right hand end (when viewed as in Fig. 1), are standards 30 for supporting a reel 31 on which the long strip 32 of material to be cut is wound. A suitable spring mounted on one of the standards 30 may press against the side of the reel 31 to produce enough friction to prevent the material from unreeling too rapidly. As the strip 32 is unwound, it is led over suitable guiding pulleys or rollers 33, 34, and 35, to the opposite end of the table, where it is bent around a rounded portion at the left hand end of a plate 37 secured to the table, as best shown in Fig. 6, and extends rightwardly along the top of the table to the cutting knives.

The cutting knives are preferably arranged in what may be termed two knife assemblies, for making simultaneously or concomitantly the two cuts in the strip of material. The first of these knife assemblies comprises upright standards 40 which may be secured to the table or support 27 in fixed relation thereto, on either side of the path of travel of the strip of sheet material. A fixed knife element 41, substantially at the elevation of the strip of material 32, is arranged to cooperate with a movable knife element 42 mounted for vertical reciprocation in suitable guideways formed on the standards 40. The movable knife element 42 preferably has a lower edge which is inclined or oblique in a direction across the sheet of material to be cut, so that the cut will start at one side edge of the material and continue progressively across the width of the sheet as the knife continues its descent.

Any suitable means may be provided for reciprocating the knife element 42. For example, the knife element may be connected by pivoted links 45 to a pair of arms 46 secured to a shaft 47 mounted in ball bearings 48 on the standards 40. Near one end, the shaft 47 has fixed to it a gear segment 49 meshing with gear teeth 50 on one edge of a vertically movable rack bar 51 capable of reciprocation in a suitable guideway associated with one of the standards 40. On another edge at right angles to the edge containing the teeth 50, this rack bar 51 has other teeth 52 meshing with the gear segment 53 secured to a shaft 54 running longitudinally along the machine. Hence, if the shaft 54 be turned, it will move the rack bar 51 either upwardly or downwardly depending on the direction of movement of the shaft, and this will move the knife element 42 downwardly or upwardly.

The second knife assembly comprises upright standards 60 on opposite sides of the path of travel of the sheet material to be cut, which standards may be secured in fixed relation to the table or support 27 but which are preferably secured to a slide 61 movable toward and away from the first knife assembly along horizontal guideways formed on the frame or table 27. A cross bar 63 (Fig. 7) connects the bottom ends of the standards 60 to each other and form a part of the carriage 61. This cross bar 63 has an inclined upper surface and is recessed near its upper edge to form a seat for the bottom knife element 64 which has one vertical edge 65 lying in the plane of movement of the upper knife element to cooperate therewith and which has a narrow upper horizontal edge 66, and an inclined side 67 extending obliquely downwardly from the top edge 66 in a direction away from the first knife assembly. Screws 68 extending through holes or slots in a knife 64 and into tapped openings in the bar 63 serve to hold the knife 64 securely to the bar and to permit any necessary slight adjustment of the position of the knife relatively to the bar.

The upper or movable knife element of this second knife assembly is indicated at 70 and, like the corresponding knife 42 of the first knife assembly, is mounted for vertical movement in suitable guideways in the standards 60. Like the other movable knife 42, the knife 70 has a lower edge which is slightly inclined from one end to the other so that when this knife moves down into cooperation with the lower knife 64 of this second knife assembly, the cut starts at one edge of the sheet material and progresses across the sheet. The knife is connected by links 71 to a pair of arms 72 fixed to a shaft 73 mounted in ball bearings 74 on the standards 60, which shaft has fixed to it near one end a gear segment 75 connected with teeth 76 on one edge and a rack bar 77 vertically movable on a suitable guideway associated with one of the standards 60. Near its lower end, the rack bar 77 has, on another edge at right angles to the teeth 76, a series of teeth 78 which mesh with an elongated gear segment 79 fixed to the shaft 54. The gear segment 79 is made sufficiently long in a direction longitudinally of the shaft 54 so that it will be properly in mesh with the rack bar 77 in any position to which the second knife assembly may be moved within its normal range of movement back and forth along the table, toward and away from the first knife assembly. It will be seen that when the shaft 54 is turned, both of the knife assemblies will be correspondingly operated substantially simultaneously through their respective rack bars 51 and 77.

The feeding mechanism hereinafter described projects the strip of sheet material 32 across the space between the two knife assemblies, in the manner best shown in Fig. 7, so that the narrow waste zone projects beyond the effective cutting edge 65 of the knife 64 of the second knife assembly, which cutting edge 65 defines one edge of the useful area or card to be cut from the stack, while the effective edge of the knife 41 of the first knife assembly defines the opposite edge of the useful area or card. The space between these two knives is free as seen especially in Fig. 7, so as to offer no impediment to free downward movement of the card area after it has been cut. In fact, to facilitate such downward movement, the edge of at least one of the two lower knives is undercut or inclined slightly backwardly away from the other knife assembly.

If, now, with the parts in the position illustrated in Fig. 7, the shaft 54 is partially turned by any suitable mechanism such as that hereafter described, the knives 42 and 70 of the two knife assemblies will be forced downwardly and will make two cuts in the strip of material 32, the knife 42 making a cut along the line C of Fig. 2, and the knife 70 making a cut along the line B of Fig. 2, it being understood that a cut along the line A of Fig. 2 has previously been made as part of the next preceding cutting operation. When the two cuts are completed by these two knife assemblies, the larger of the two pieces thus cut, being the useful or card area, will fall downwardly in the space between the two knife assemblies into a convenient receiving drawer 85 (Fig. 1) in which successive cards may be stacked in the same order in which they are cut. The smaller of the two cut pieces, being a small waste strip, will slide down the inclined surface 67 of the knife 64 and down the correspondingly inclined upper surface of the cross bar 63 and fall into a drawer 86 (Fig. 1) from which these scraps may be removed from time to time as desired.

To assist in making clean cuts, the knife 70 is provided with a holding element 90 (Figs. 7 and 10) secured to the knife by screws 91 passing through slots 92 in the element. A coiled tension spring 93 having one end secured to a stud 94 on the knife blade 70 and its other end secured to a stud 95 on the holding element 90, tends to keep the holding element 90 in its lowermost position with respect to the knife element 70, but permits the holding member 90 to move upwardly relatively to the knife, to the extent permitted by the length of the slots 92.

In its normal lowermost position, the holding member 90 projects somewhat below the lower edge of the knife 70, and it lies flat against that side of the knife which is remote from the other knife assembly. Hence, as the knife 70 moves downwardly, the holding member 90 first moves into contact with the sheet material 32 and presses it down and holds it firmly against the upper narrow flat edge 66 of the lower knife 64, before the cut begins. Continued downward movement of the knife 70 results in stretching the spring 93, meanwhile keeping the member 90 clamped on the waste portion of the sheet material, thus holding it firmly during the making of the entire cut so that a good clean cut is made and so that the sheet material, even when relatively thin or weak, is not pulled or torn by the knives.

The upper edge 66 of the lower knife 64 of the second knife assembly may be placed at an elevation slightly below the upper edge of the lower knife 41 of the first knife assembly, so that any slight deflection of the sheet material as it is projected forwardly beyond the knife 41 will not cause it to hit the knife 64. Usually, the strip of material is unwound from the reel 31 in such a way that any set or tendency to curl which may be caused by having been wound on the reel, causes the forward projecting end of the sheet material to curl upwardly rather than downwardly, thus additionally insuring that the advancing edge will clear the top of the knife 64.

In case there should be too much upward curling tendency, it is desirable to provide guides for association with the two knife assemblies to hold the strip of sheet material down approximately where it belongs. For example, a cross bar 100 may be mounted on the standards 40 of the first knife assembly, in a position slightly in advance of the plane of the knife 42, as shown in Fig. 7, and this cross bar 100 may carry a series of spaced fingers 101 of wire or small rods, projecting obliquely downwardly and toward the second knife assembly, as shown, so that if the advancing edge of the sheet material is curled upwardly, the fingers or guides 101 will force it downwardly in the proper manner. Similarly, the second knife assembly may have a cross bar 102 mounted on the standards 60 on that side of the knife blade 70 which is toward the first knife assembly, and this cross bar 102 may carry other wire or rod fingers 103 to assist in guiding the advancing edge of the sheet material. Preferably the guiding fingers 101 on the first knife assembly are staggered or slightly offset laterally with respect to the guiding fingers 103 on the second knife assembly, in order that when the two knife assemblies are brought relatively close together the fingers will not interfere with each other.

Cutting knives ordinarily work in guideways of fixed width or thickness. This usually produces cuts which are not wholly satisfactory, especially when only a single sheet is cut at a time, because the fixed knife and the movable knife frequently separate slightly from each other in a lateral direction, and do not produce a correct shearing action. This is overcome, according to the present invention, by providing spring gibs, preferably in connection with the movable knives of both knife assemblies, to press the movable knives laterally toward their respective fixed knives and thus to hold them in proper cooperative relationship to make correct shearing cuts.

Referring now to Fig. 15 of the drawings, which shows a detail of the spring gib construction as applied, for example, to the first knife assembly, it is seen that the movable knife blade 42 operates in the guideway formed between a surface of the standard 40 on one side and a member 40a on the other side. This member 40a is recessed to provide space for coiled compression springs 40b, preferably three in number, which press against a spring gib or bearing plate 40c and press it, in turn, against the side of the knife blade 42. Thus the movable knife blade 42 is always kept pressed laterally against the solid guiding surface of the standard 40, which guiding surface is set very slightly (a few thousandths of an inch) back of the knife edge of the fixed knife blade 41. At those corners of the knife blades which first come into contact with each other during a cutting operation, one or both of the knife blades are slightly bevelled or cut back so that these corners of the blades will pass each other properly. During the downward movement of the blade 42, the initial contact of the bevelled corners of the blades 41 and 42 will cam the blade 42 laterally against the force of the springs 40b, and during the remainder of the downward movement the springs will keep the cutting edge of the blade 42 pressed firmly against the cutting edge of the blade 41, so that a true and correct shearing action will result.

This spring gib construction is used for guiding both ends of the knife 42, and the same construction is used for both ends of the knife 70 of the second knife assembly, as may be seen from Fig. 5. Each of the knives 42 and 70, even at its narrowest end, is of a height extending throughout more than half of the height of the guideway in which the knife moves. Thus, no matter what the position of the movable knife up and down its guideway, there is at all times a greater spring force tending to hold the gib 40c flat against the knife than a force tending to tilt the gib around the upper or lower edge of the knife, with the result that this spring gib lies flat against the knife surface at all times.

In order that the second or movable knife assembly may be readily adjusted toward and away from the first knife assembly to cut cards or pieces of different size as desired, the second knife assembly preferably has mounted on it a cross shaft or transverse shaft 110 (Figs. 5, 8, and 12) to which are fixed two pinions 111, each meshing with a rack bar 112, one near each side of the carriage 61. A hand wheel 113 at one end of the shaft 110 provides a convenient means for turning it, and when it is turned, the carriage 61, and with it the whole second knife assembly, is fed backwardly or forwardly toward or away from the first knife assembly.

To assist in positioning the movable knife assembly in any one of a few standard positions for cutting stock in standard predetermined sizes, a templet or gauge 115 (Fig. 12) is pivoted at 116 to the carriage of the knife assembly, and is notched to provide a series of abutments 117, 118, and 119 at different distances from the pivot 116. By means of a convenient handle 120, the templet 115 may be swung upwardly or downwardly to bring any selected one of the abutments into the proper horizontal position to cooperate with a corner 122 formed on any convenient fixed part of the table, such as a corner of one of the frame members of the first knife assembly. Suitable indicia are provided on templet 115 in association with each of the abutments 117, 118, and 119, the indicia shown in Fig. 12 consisting of the numerals "3", "4", and "5", which indicate, respectively, that when the abutment 117 is in contact with the corner 122, the knife assemblies are spaced the proper amount to make a 3 inch cut between them, and when the abutment 118 is in contact with the corner 122, they are properly spaced to make a 4 inch cut, and similarly when the abutment 119 is used, a 5 inch cut is made. Any number of abutments or shoulders may be provided on the templet, at any suitable intervals which are chosen as those most likely to be used for setting the knives.

After the movable knife assembly has been moved to its desired position with respect to the fixed knife assembly, either with or without the aid of the templet 115, it is preferably clamped in such position as for example by tightening the bolts 125 (Fig. 5) which firmly clamps the carriage 61 to the table or support 27. These bolts should be loosened before the carriage is again moved to another position.

A protecting guard 130, which may be of grillwork or any other suitable construction, is preferably provided to enclose both of the knife assemblies to prevent accidental contact with the knife blades in operation.

The web guiding and feeding mechanism will now be described. Referring first to Figs. 4, 5, and 6, the top of the plate 37 is provided with a smooth covering plate 140 forming a surface of low friction over which the web of material 32 may easily slide. The forward end of this plate 140 is slightly tilted up at 141 to raise the web, as it advances, to the slightly higher elevation of the top surface of a plate 142 which extends forwardly substantially to the rear edge of the knife 41. The central portion of this plate 142 is slightly higher than the side edges thereof, as best seen in Fig. 4, this high portion of the plate being of a width substantially equal to the distance between the two lines of perforations 22 in the web 32, so that immediately below the perforations themselves, there is a slight open space, as plainly seen in Fig. 4.

As the web advances, it passes between a pair of side guides 145, each of the guides being mounted on a slide 146 movable in a transverse groove or guideway 147 and operated by a transverse shaft 148 which extends transversely slightly above the path of travel of the web 32, and which has a right hand thread engaged with threads on one of the side guides 145 and a left hand thread engaged with threads on the other of these side guides. Hence, when the shaft 148 is turned by means of the knob 149, the side guides 145 are moved closer to or farther away from each other, to adjust them to different widths of webs of material to be cut on this machine. Each side guide is provided with a groove 150 in its edge toward the other guide, for receiving the side edge of the web.

Near the rear end of the plate 37 (that is, the left hand end when viewed as in Figs. 5 and 6) there is a bridge piece 153 extending transversely across the plate 37 with sufficient room beneath it for the passage of the web of material. On this bridge piece is mounted a bracket 154 to which is pivoted by a shaft 155, a bail 156 carrying at its lower edge a strip 157 of rubber or other suitable high friction material. The parts being positioned as best shown in Fig. 6, it is apparent that this strip 157 does not interfere appreciably with forward feeding movement of the web of material, but does act as a friction brake to prevent backward or retrograde movement of the web.

A bridge 160 is rigidly mounted on the standards 40 of the first knife assembly, and extends across the path of travel of the sheet material, leaving space beneath it for passage of the sheet. Rearward extensions 161 on this bridge have grooves which, together with plates 162, form guideways for a reciprocating feeding carriage 163 movable back and forth in the direction of movement of the web. This carriage has a cross bar 164 located in a convenient position to be grasped by the operator's fingers for manual movement of the carriage. The carriage also has a pair of upstanding ears 166, to each of which is pivoted a forwardly and downwardly extending feeding dog 167, the forward ends of the two dogs being connected to each other by a cross bar 168. These dogs have pointed ends spaced from each other by a distance equal to the distance between the two rows of perforations 22 in the web 32, and are alined with these rows of perforations, so that they may enter the same for feeding the web forwardly. The forward ends of the dogs also have laterally extending lugs 169 (Fig. 4) to overlie a portion of the web 32 adjacent the perforation 22 in order to limit the extent to which the dogs extend through the holes in the web. It will be noted from Fig. 4 that these lugs 169 extend over the higher portion of the plate 142 and thus ride on a part of the web which is firmly supported by this higher portion of the plate, causing no bending of the web of material, whereas the points at the ends of the dogs extend through the perforations 22 slightly beyond the edges of the high part of the plate 142, where there is ample space beneath the web so that the ends of the feeding dogs may project slightly below the bottom surface of the web.

Gravity alone is usually sufficient to cause the feeding dogs to fall properly into the perforations 22 in the web, but to increase the reliability of the apparatus, it is preferred to employ also springs 171 having their forward ends secured to a cross bar 172 fixed on the carriage 163 and having their rear ends attached to upstanding lugs 173 on the feeding dogs 167, so that the springs tend to depress the forward ends of the dogs.

The feeding carriage 163 has a range of movement slightly greater than the amount of feeding necessary between each two cutting operations on the largest sized card or area to be cut within the capacity of the machine. Its rearward movement is limited by contact of a lug 175 (Figs. 3 and 4) on the carriage with an abutment or stop 176 on one of the guideway pieces 161. The abutment 176 may be rigid with the piece 161 but preferably, in order to reduce jars, the abutment 176 is resiliently mounted. For instance, it may be formed on a slide 177 having slots through which studs 178 extend so that the slide 177 has a limited range of movement with respect to the guideway piece 161, and a spring 179 constantly tends to hold the slide 177 in its forward position. As the feeding carriage is moved rearwardly by the operator grasping the handle or bar 164, the lug 175 on the carriage strikes the abutment 176 on the slide 177 and the slide yields slightly rearwardly by extending the spring 179, thus stopping the rearward movement of the feeding carriage without a severe jar.

In its rearmost position the feeding carriage is placed so that the feeding dogs 167 are slightly to the rear of a pair of perforations 22 in the web 32, this position being illustrated in Fig. 6. Then, as the operator moves the feeding carriage forwardly by pushing forwardly on the bar 164, the dogs 167 enter the perforations 22 and feed the sheet material forwardly until the forward movement of the carriage is stopped by contact of the end of an adjustable abutment screw 181 on the carriage with a fixed abutment member 182 on the bridge piece 160, this positioning of the parts being illustrated in Fig. 7. The adjusting screw 181 is so adjusted that when it comes into contact with the abutment 182, the sheet material will have been fed to exactly the right position for making the two cuts at precisely the proper points with respect to the perforations 22, these being, for example, at the points indicated at B and C in Fig. 2 of the drawings. The top surface of the knife 41 is grooved at 184 in line with the path of travel of the feeding dogs 167 so as not to interfere with the ends of these dogs projecting beneath the bottom surface of the web of sheet material.

The operator preferably sits at the rear end of the apparatus (or left hand end when viewed as in Figs. 1, 5, and 6) facing the cutting knives, and with one hand, preferably the right hand, grasping the feeding bar 164, which he shoves forwardly before each cutting operation to feed the web of sheet material ready for the cut. Then he operates the cutting knives to make the cut, after which he pulls the feeding carriage rearwardly (the friction brake 157 meanwhile preventing rearward movement of the sheet material) to the rearward limit of its movement, and again moves the feeding carriage forwardly to the forward limit of its movement, then operating the knives to make another cut. It is to be noted that the feeding mechanism automatically takes care of the proper positioning of the respective areas on the web of material with respect to the knife elements, so that it is not necessary for the operator to observe the position of the respective web areas relatively to the knives.

The operation of the knives may be accomplished by the operator in any desired way, such as manually, by a treadle, or otherwise, but preferably the knives are operated by power means which is tripped when desired by the operator. For example, an electric motor 190 may be provided, which motor runs constantly while the apparatus is in operation. Through suitable reduction gearing, indicated in general at 191, the motor constantly drives a shaft 192 which carries a so-called single-revolution clutch 193 of any suitable known construction. When this clutch is tripped, it connects the shaft 192 to the shaft 194 for a single revolution only, and then disconnects the shafts from each other so that further driving of the shaft 194 is avoided until the single-revolution clutch is again tripped. The shaft 194 carries a crank 195 (Figs. 5 and 11) connected by a link 196 to a crank arm 197 on the shaft 54. Thus, when the shaft 194 makes a single revolution, its crank 195 moves link 196 to cause a single oscillation of the shaft 54, which oscillation lowers the two cutting knives 42 and 70 to make a cut and then raises them to their initial open position.

To prevent overrunning of the shaft 194 and to stop it always at the same position, this shaft is provided with a thick disk 200 (Figs. 12, 13, and 14), fixed to the shaft, which has a single notch 201 in its periphery which is engaged by a nose on the end of a dog 202 mounted on a fixed part of the framework and pressed against the periphery of the disk by a spring 203. The driving force of the motor, when the single-revolution clutch is tripped, is sufficient to lift the dog 202 out of the notch 201 and permit the revolution of the disk 200 with the shaft 194, but the single-revolution clutch disconnects the shaft 194 from the driving motor slightly before the notch 201 again comes around to the dog 202, and when the notch again comes in line with the dog, the dog drops into it and offers enough resistance to further movement so that the shaft is stopped at this point. It is also desirable to provide a frictional drag to assist in slowing up and stopping shaft 194 at the end of each single revolution. This frictional drag may be incorporated in part in the disk 200. For example, on one surface of the disk is a layer 206 of frictional material, such as brake lining, or the like, and against this is placed an annular member or disk 207 having an extension held in a fixed bracket 208 so that the member 207 may not rotate with the shaft 194. On the opposite side of the member 207 is another layer 209 of friction material similar to the material 206, and an annular shoe 210 overlies the material 209. Pins 211, extending through holes in the shoe 210, are fixed in cavities in a housing 212 fixed to the disk 200 to prevent rotation of the shoe relatively to the disk, and springs 213 mounted in cavities in this housing 212 serve to press the shoe 210 against the friction material 209, which, in turn, is pressed against the member 207 and presses this member against the other friction material 206. By this arrangement, a substantial frictional drag on the shaft 194 is constantly provided, which is easily overcome by the motor 190 so long as the shaft 194 is connected to the motor, but which rapidly slows down the shaft as soon as the single-revolution clutch has disconnected it from the motor. By means of adjusting screws 215 the tension of the springs 213 may be varied in order to vary the resistance offered by this frictional drag.

The single-revolution clutch 193 is tripped in known manner, the trip being operated by means of a rod 220 (Fig. 5) moved by a bell crank 221 operated by a rod 222 (Figs. 5 and 16), which is connected to one arm 223 of a bell crank pivoted at 224 to a fixed part of the frame, and influenced by a spring 225 connected to the other arm 226 of the bell crank to tend constantly to raise this arm. The arm 226 is pivotally connected to a depending lug or extension 227 on a trip bar, on the top of which loosely rests the outer end of a trip plate 228 (Figs. 16 and 17), the opposite end of which trip plate is pivoted on screw studs 229 threaded into the ends of a block 230 mounted on one of the fixed guides 161 of the feeding carriage, as shown in Fig. 3. Thus the spring 225 constantly tends to raise the outer end of the plate 228 and the trip bar on which it rests to the upper limit of the motion of the trip bar, but a slight downward pressure on the plate will move its outer end downwardly, thus depressing the trip bar, pushing downwardly on the bell crank arm 226, causing a pull on the rods 222 and 220, and tripping the single-revolution clutch.

It is to be noted that the trip plate 228 is placed very conveniently for actuation by the operator. In fact, if the operator manipulates the feeding bar 164 with his right hand it will be found that when the feeding carriage is at the forward limit of its motion his right wrist or right forearm are directly over the trip plate 228. Thus, after moving the feeding carriage forwardly, it is only necessary for the operator to depress his right forearm without removing his fingers from the feeding bar 164, and this depression of his forearm will depress the trip plate 228 and cause the motor to actuate both of the knife assemblies to make two concomitant cuts in the web of sheet material. As soon as the trip plate has been depressed, the operator again raises his arm and at the conclusion of the cutting operation he pulls the feeding carriage rearwardly and again shoves it forwardly to feed the sheet material for the next cutting operation. Should the operator prefer not to use this trip plate 228, it may be readily removed by unscrewing the screw pivots 229, and the trip bar at the top of the member 227 may be used for tripping the clutch.

The operation of the apparatus has been described in detail in connection with the description of each part thereof. It may be convenient, however, to give a brief outline of the operation of the machine as a whole. The web 32 of material to be cut is fed from the reel 31 (Fig. 1) and carried under the machine to the rear end thereof, where it passes around the rear edge of the plate 37 and forwardly to the cutting knives. The frictional brake 157 prevents retrograde movement of the web. The operator, by grasping the feeding bar 164 of the feeding carriage 163, moves this carriage rearwardly, to the left when viewed as in Fig. 1, to the rearmost limit of its movement, which is the position illustrated in Fig. 6. He then moves the carriage forwardly to the forward limit of its motion, which is the position illustrated in Fig. 7. During this forward movement the feeding dogs 167 enter a pair of perforations 22 in the web 32 and feed the web forwardly until the theoretical lines B and C (Fig. 2) always spaced a definite constant distance from the holes 22, are properly lined up with the cutting knives as illustrated in Fig. 7.

The operator then depresses his right forearm to depress the trip plate 228, which trips the single-revolution clutch 193, the motor 190 meanwhile being constantly running. The clutch connects the shaft 194 to the motor for a single revolution only of the shaft, which single revolution causes the shaft 54 (Fig. 12) to make one complete oscillation. In the course of this oscillation, gear segments 53 and 79 first push upwardly and then pull downwardly on the respective rack bars 51 and 77 of the two knife assemblies.

This upward and then downward movement of the rack bars 51 and 77 causes oscillation of the respective knife operating shafts 47 and 73, with the result that both of the knives 42 and 70 are concomitantly operated first downwardly to make two substantially simultaneous cuts in the web of sheet material along the lines B and C (Fig. 2) and then are moved upwardly to their initial or rest positions, illustrated in Fig. 7.

As the knives descend, the holding member 90 on the knife 70 comes down onto the top of the sheet material before the cut begins and holds it firmly during the cutting operation. During the subsequent upward movement of the knives, the holding member 90, in rising from the small strip of waste material containing the perforations 22 (that is, the strip between the lines A and B of Fig. 2), disturbs this strip sufficiently so that it is dislodged from the flat top 66 of the knife 64, and the strip slides down the inclined top surface 67 of the knife 64 and into a drawer 86, where the scraps accumulate. At or about the same time, the card or other useful area which has been cut from the web (that is, the area between the lines B and C of Fig. 2) falls directly into the receptacle 85, in which the cards or sheets are stacked in the order in which they are cut, and from which they are removed from time to time as desired.

When it is desired to adjust the mechanism to cut areas or cards of different sizes, the studs 125 (Fig. 5) are loosened and the second or movable knife assembly (knives 64 and 70) is bodily moved toward or away from the fixed or stationary knife assembly, by rotation of the wheel 113 on the pinion shaft 110. The gauge bar 115 may be used to set the movable knife assembly in proper position to cut any one of a number of standard card sizes, but obviously the knife assembly may be set in position to cut any size of card desired (within the range of the machine) whether it is a standard size or an odd size. After the knife assembly has been set to the proper position, the studs 125 are again tightened to hold it firmly in this position. If the new size of card to be cut involves also a change in the width of the strip or web of sheet material, this is easily taken care of by turning the wheel 149 (Figs. 3 and 5) to adjust the side edge guides 145 to the proper position to accommodate the new width of web between them. No adjustment of the feeding carriage is necessary, as it is contemplated that all widths of web material to be cut with this machine shall have the rows of perforations 22 spaced the same distance laterally from each other, notwithstanding variations in the total width of the web.

As above stated, the widths of the waste areas between the useful or card areas frequently vary somewhat, due to inaccuracies in feeding the sensitized sheet material through the camera between each two exposures. The holes 22, however, are punched in the sheet concomitantly with the taking of each exposure, and are always in the same definite spaced relationship to the adjacent edge of the adjacent useful or card area which was photographed at the same time the holes were punched. Hence, if the strip of material be properly wound on the reel 31 and fed in the right direction through the cutting apparatus, with the uniform space between a pair of holes 22 and the adjacent card area lying in front of, rather than behind, the feeding fingers 167, it is apparent that the concomitant cuts made by the two knife assemblies will be in exactly the right positions at two edges of the card area, irrespective of variations in the widths of the waste areas between the card areas. A wide waste area will project beyond the second knife assembly for a greater distance than a narrower waste area, so that the scraps cut off by the second knife assembly may be of different widths, but without in any way affecting the widths of the card areas or the proper registry of the cuts with the edges of the desired card areas.

It is also seen that, so long as the two knife assemblies remain set in fixed relation to each other, all of the useful areas or card areas cut by the apparatus will be of precisely the same width. This is of great importance when the cut areas are to be filed on edge in a card cambinet or the like, to form a card index or catalog, because it is found that a slight variation of a few thousandths of an inch in the widths of adjacent cards will make it difficult to pull over the cards one by one in the file. With the present apparatus, all such variations are avoided, and the cards are cut with an accuracy practically equal to that of die-cut cards. Yet it is but a matter of a few moments to change the adjustment of the knife assemblies to cut a different size of cards, when desired.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

We claim:

1. Sheet cutting apparatus comprising a pair of knife elements movable relatively to each other to effect a cutting operation, a second pair of knife elements also movable relatively to each other to effect a cutting operation, means for moving said second pair toward and away from the first pair to vary the space between them, and means including a gear segment and a rack bar meshing with each other and slidable laterally relatively to each other while remaining continuously in meshing relation to each other when said second pair is moved toward or away from the first pair, for operating said second pair of knife elements to make a cut irrespective of the position to which said second pair may be moved relatively to said first pair.

2. Sheet cutting apparatus comprising a frame, a pair of knife elements movable relatively to each other to effect a cutting operation and mounted for bodily movement together on said frame to different positions of adjustment, a toothed member for operating said knife elements, said toothed member being bodily movable with said elements to said different positions of adjustment, and a second toothed member mounted on said frame and meshing with said first mentioned toothed member for operating it, one of said toothed members having relatively wide teeth so that said two toothed members will remain in mesh with each other in all of said different positions of adjustment of said knife elements.

3. Sheet cutting apparatus comprising a frame, a pair of knife elements movable relatively to each other to effect a cutting operation, a second pair of knife elements also movable relatively to each other to effect a cutting operation and mounted for bodily movement together on said frame toward and away from the first mentioned pair of knife elements to different positions of adjustment, a toothed member associated with each pair of knife elements for operating that pair to make a cut, a shaft extending past both of said pairs, and toothed members mounted on said shaft and meshing with said toothed members associated with said pairs of knife elements so that rotation of said shaft will cause concomitant operation of the knife elements of both of said pairs.

4. Sheet cutting apparatus comprising a support, a knife assembly mounted on said support, a second knife assembly movably mounted on said support for adjustment toward and away from the first mentioned knife assembly to vary the distance between cuts made by the two knife assemblies, sheet guiding means including a series of laterally spaced guiding fingers mounted on one knife assembly and extending toward the other, and other sheet guiding means mounted on the second knife assembly and extending toward the first, at least part of said guiding means being in a position overlying the sheet to prevent excessive upward curling of the sheet between the two knife assemblies.

5. Sheet cutting apparatus comprising a support, a knife assembly mounted on said support, a second knife assembly movably mounted on said support for adjustment toward and away from the first mentioned knife assembly to vary the distance between cuts made by the two knife assemblies, and a templet member mounted on one of said knife assemblies and having a plurality of abutment shoulders for selective cooperation with the other of said knife assemblies to assist in setting the movable one of said knife assemblies at any one of a plurality of predetermined definite distances from the other of said knife assemblies.

6. Sheet cutting apparatus comprising a support, a knife assembly mounted on said support, a second knife assembly movably mounted on said support for adjustment toward and away from the first mentioned knife assembly, a rack mounted on said support, a shaft rotatably mounted on said second knife assembly, a pinion mounted on said shaft and meshing with said rack so that when said shaft is turned said second knife assembly will be moved toward or away from said first mentioned knife assembly, and means for operating both of said knife assemblies concomitantly to make two spaced cuts in a sheet of material.

7. Apparatus for cutting a strip of sheet material having perforations therein at intervals, comprising knife means for completely severing successive portions of the strip of material transversely, a feeding carriage manually movable toward and away from said knife means, and finger means mounted on said feeding carriage for engaging one or more of said perforations in advance of said knife means to feed the strip relatively to said knife means upon movement of said carriage in one direction.

8. Apparatus for cutting a strip of sheet material having perforations therein at intervals, comprising knife means for completely severing the strip of material transversely at intervals, a feeding carriage manually movable toward and away from said knife means, finger means mounted on said feeding carriage for engaging one or more of said perforations in advance of said knife means to feed the strip relatively to said knife means upon movement of said carriage in one direction, and one-way frictional brake means for resisting retrograde movement of the strip during movement of said carriage in the opposite direction.

9. Sheet cutting apparatus comprising knife means for severing a sheet, a feeding carriage freely movable by hand toward and away from said knife means and including means for engaging a sheet to feed the sheet relatively to said knife means upon movement of said carriage in one direction, and stop means for limiting the extent of movement of said feeding carriage and thereby determining the position of said sheet with respect to said knife means at the conclusion of a feeding movement of said carriage.

10. Sheet cutting apparatus comprising knife means for severing a sheet, a feeding carriage movable manually toward and away from said knife means and including means for engaging a sheet to feed the sheet relatively to said knife means upon movement of said carriage in one direction, power means for operating said knife means, and means closely adjacent said feeding carriage for manually controlling said power means.

11. Apparatus for cutting sheets of predetermined size from a strip of material having areas for forming said sheets of predetermined size alternating with other areas having perforations therein, said apparatus comprising strip severing means, other strip severing means spaced from the first mentioned severing means by a distance equal to one dimension of the sheet of predetermined size to be cut, means cooperating with said perforations for feeding the strip to be cut into effective position with respect to both of said severing means, and means for concomitantly operating both of said severing means to cut from the strip a waste piece containing one or more of said perforations and also a piece of said predetermined size.

12. Apparatus for cutting useful areas of predetermined size from a continuous strip of sheet material having a series of such useful areas alternating with waste areas each having a perforation therein with one edge of each perforation at a uniform predetermined distance from one edge of an adjacent useful area, said apparatus comprising a pair of knife elements movable relatively to each other to effect a transverse cut across said strip to sever one of said waste areas from the end of the strip and thereby to cut one edge of an adjacent useful area, a second pair of knife elements movable relatively to each other to effect a transverse cut across said strip to cut the opposite edge of said adjacent useful area and thereby to sever such useful area from the strip, means for concomitantly operating both pairs of knife elements, carriage means mounted for reciprocation adjacent said strip in advance of said knife elements, and means mounted on said carriage means for engaging one of said perforations to feed said strip when said carriage means moves in one direction.

13. Apparatus for cutting useful areas of predetermined size from a continuous strip of sheet material having a series of such useful areas alternating with waste areas each having a perforation therein with one edge of each perforation at a uniform predetermined distance from one edge of an adjacent useful area, said apparatus comprising a pair of knife elements movable relatively to each other to effect a transverse cut across said strip to sever one of said waste areas from the end of the strip and thereby to cut one edge of an adjacent useful area, a second pair of knife elements movable relatively to each other to effect a transverse cut across said strip to cut the opposite edge of said adjacent useful area and thereby to sever such useful area from the strip, means for adjusting one of said pairs of knife elements toward and away from the other to vary the distance between the cuts made thereby, means for concomitantly operating both pairs of knife elements, and feeding means mounted for reciprocation adjacent said strip for engaging one of said perforations to advance said strip when said feeding means moves in one direction.

14. Apparatus for cutting useful areas of predetermined size from a continuous strip of sheet material having a series of such useful areas alternating with waste areas each having a perforation therein with one edge of each perforation at a uniform predetermined distance from one edge of an adjacent useful area, said apparatus comprising a pair of knife elements movable relatively to each other to effect a transverse cut across said strip to sever one of said waste areas from the end of the strip and thereby to cut one edge of an adjacent useful area, a second pair of knife elements movable relatively to each other to effect a transverse cut across said strip to cut the opposite edge of said adjacent useful area and thereby to sever such useful area from the strip, means for adjusting one of said pairs of knife elements toward and away from the other to vary the distance between the cuts made thereby, means for concomitantly operating both pairs of knife elements, said operating means including cooperating toothed members one slidable relatively to the other when said one of said pairs is adjusted to a different position, the teeth of said members remaining in toothed engagement with each other in all positions of adjustment of said one of said pairs, and feeding means engaging said perforations in said strip to advance said strip to position said strip properly with respect to said knife elements.

15. Apparatus for cutting useful areas of predetermined size from a continuous strip of sheet material having a series of such useful areas alternating with waste areas each having a perforation therein with one edge of each perforation at a uniform predetermined distance from one edge of an adjacent useful area, said apparatus comprising a pair of knife elements movable relatively to each other to effect a transverse cut across said strip to sever one of said waste areas from the end of the strip and thereby to cut one edge of an adjacent useful area, a second pair of knife elements movable relatively to each other to effect a transverse cut across said strip to cut the opposite edge of said adjacent useful area and thereby to sever such useful area from the strip, power means for concomitantly operating both pairs of knife elements, said power means including a constantly running motor and a trippable clutch, manually operable carriage means mounted for reciprocation adjacent said strip, means mounted on said carriage means for engaging one of said perforations to advance said strip relatively to said pairs of knife elements when said carriage means is moved in one direction, and manually operable means adjacent said carriage means for tripping said clutch to cause said motor to operate said pairs of knife elements.

16. Apparatus for cutting useful areas of predetermined size from a continuous strip of sheet material having a series of such useful areas alternating with waste areas each having a perforation therein with one edge of each perforation at a uniform predetermined distance from one edge of an adjacent useful area, said apparatus comprising a table, means extending upwardly from said table adjacent one end thereof for holding a reel on which the strip of material to be cut is wound, means for guiding said strip from said reel downwardly past the adjacent end of said table and longitudinally beneath said table and upwardly over the end of said table remote from said reel, feeding carriage means mounted for reciprocation on said table adjacent said remote end thereof, said carriage means having means for engaging one of said perforations to advance said strip in a general direction from said remote edge toward said reel when said carriage means is moved in said general direction, two pairs of knife elements mounted on said table between said carriage means and said reel-holding means, each of said pairs including elements movable relatively to each other to effect a transverse cut across the strip to sever a portion from the strip, the cuts made by said two pairs being spaced from each other, and means for concomitantly operating both pairs of knife elements.

17. Sheet cutting apparatus comprising two knife blades, a lower blade normally stationary during a cutting operation and an upper blade mounted for movement downwardly toward the lower blade in shearing relation thereto to cut a sheet interposed between the two blades and upwardly away from the lower blade to provide a sheet receiving space between the two blades, means for feeding sheet material from one side of the cut line of said two blades through said space to the other side of said cut line, said lower blade being on the far side of said cut line with respect to the direction of feeding movement of said sheet material and having a narrow flat upper edge on which the free end of said sheet material rests during the cutting operation, means forming a space immediately beyond said edge into which the severed end of said sheet material beyond said cut line may drop, a bar slidably mounted for upward and downward movement on said upper blade on the far side thereof with respect to the direction of feeding movement and in alinement with said narrow flat upper edge of said lower blade, and spring means resiliently tending to move said bar downwardly on said upper blade to a position projecting below the lower end of said upper blade, so that as said upper blades moves downwardly to make a cut, the lower edge of said bar will first press down upon the sheet material immediately overlying said upper edge of said lower blade to hold firmly the projecting end of said sheet material beyond said cut line while said upper blade completes its downward movement and makes a shearing cut.

18. Sheet cutting apparatus including a stationary knife blade, a movable knife blade mounted for reciprocating movement toward and away from said stationary blade in cutting relation thereto, and guideway means for guiding said movable blade during said movement, said guideway means including a stationary guiding wall contacting with that side of said movable blade which is toward said stationary blade, a movable wall elongated in the direction of movement of said movable blade and contacting with the opposite side of said movable blade from said stationary wall throughout a substantial distance in the direction of movement of said blade, and spring means constantly tending to press said movable wall in a direction toward said stationary wall to hold said movable blade constantly in contact with said stationary wall, said movable blade moving in the space between and sliding over the faces of both of said walls during its movements toward and away from said stationary blade.

19. Sheet cutting apparatus including a stationary knife blade, a movable knife blade mounted for reciprocating movement toward and away from said stationary blade in cutting relation thereto, and guideway means for guiding said movable blade during said movement, said guideway means including a stationary guiding wall contacting with that side of said movable blade which is toward said stationary blade, a movable wall elongated in the direction of movement of said movable blade and contacting with the opposite side of said movable blade from said stationary wall throughout a substantial distance in the direction of movement of said blade, and a plurality of coiled springs thrusting against said movable wall at points spaced in the direction of movement of said blade, to tend constantly to press said movable wall in a direction toward said stationary wall to hold said movable blade constantly in contact with said stationary wall, said movable blade moving in the space between and sliding over the faces of both of said walls during its movements toward and away from said stationary blade.

PAUL LANDROCK.
ARTHUR W. CAPS.